(12) United States Patent  
Lee

(10) Patent No.: US 7,331,429 B2  
(45) Date of Patent: Feb. 19, 2008

(54) BRAKE FOR COMPOSITE RIM

(75) Inventor: Steve Lee, Ta Hsin Li (TW)

(73) Assignee: Gigantex Composite Technologies Co., Ltd., Chang Hua Hsien (TW)

( * ) Notice: Subject to any disclaimer, the term of this patent is extended or adjusted under 35 U.S.C. 154(b) by 118 days.

(21) Appl. No.: 11/163,071

(22) Filed: Oct. 4, 2005

(65) Prior Publication Data

US 2006/0108184 A1    May 25, 2006

Related U.S. Application Data

(63) Continuation-in-part of application No. 10/994,674, filed on Nov. 22, 2004, now abandoned.

(51) Int. Cl.  
*B62L 1/06* (2006.01)

(52) U.S. Cl. .................................................. 188/24.13

(58) Field of Classification Search ............. 188/24.11, 188/24.12, 24.13  
See application file for complete search history.

(56) References Cited

U.S. PATENT DOCUMENTS

| 3,732,951 | A | 5/1973 | Hata et al. ..................... 188/24 |
| 4,163,482 | A | 8/1979 | Lauzier ......................... 188/24 |
| 5,484,032 | A | 1/1996 | Li .............................. 188/24.21 |
| 5,655,629 | A * | 8/1997 | Takizawa et al. ........ 188/24.12 |
| 5,913,386 | A | 6/1999 | Chen et al. ............... 188/24.12 |
| 6,089,356 | A | 7/2000 | Ohta et al. ............... 188/24.21 |
| 6,178,367 | B1 | 1/2001 | Li ................................. 701/70 |
| 6,325,401 | B1 | 12/2001 | Fujii ........................... 280/274 |
| 6,834,747 | B2 | 12/2004 | Seymour ................. 188/24.21 |

OTHER PUBLICATIONS

Applicant's admitted prior art of figures 4-6.*

* cited by examiner

*Primary Examiner*—Devon Kramer  
(74) *Attorney, Agent, or Firm*—Alan Kamrath; Kamrath & Associates PA

(57) ABSTRACT

A brake includes two rockers, two shoes attached to the rockers and two linings attached to the shoes. The brake pinches a rim without overheating the rim. The rim includes two walls and a bridge. Each of the walls includes a first portion within the bridge, a second portion beside the bridge so that the bridge performs as a heat sink and supports the second portion and a third portion beyond the bridge in order to clamp a tire. The two linings pinch the second portions of the walls. An anchor attaches the top of each of the shoes to the related rocker and is vertically spaced from the linings.

7 Claims, 6 Drawing Sheets

BRAKE FOR COMPOSITE RIM

CROSS-REFERENCE

The present patent application is a continuation-in-part application of U.S. patent application Ser. No. 10/994,674 of which the entire disclosure is incorporated herein.

BACKGROUND OF INVENTION

1. Field of Invention

The present invention relates to a brake for pinching a composite rim without overheating the rim.

2. Related Prior Art

Referring to FIGS. 4 through 6, there is a conventional brake 90 for a typical composite rim 80.

Referring to FIG. 4, the typical composite rim 80 includes two walls 81 and a bridge 82 formed between the walls 81, thus dividing each of the walls 81 into a first portion within the bridge 82, a second portion beside the bridge 82 and a third portion beyond the bridge 82. A tire 84 is put in a groove 83 defined between the third portions of the walls 81. The brake 90 includes two rockers 91 and two shoes 92 each attached to one of the rockers 91. Each of the rockers 91 defines a slot 911 for allowing the adjustment of the position of the related shoe 92. In each of the shoes 92 a lining 93 partially covers the shoes 92 for contact with one of the walls 81.

Referring to FIGS. 4 and 5, an anchor 94 and screw 95 attach each of the shoes 92 to the related rocker 91. The anchor 94 includes an enlarged head. The anchor 94 is inserted through an aperture in each of the shoes 92 and the slot 911 of the related rocker 91 while the head is left in the shoe 92. The screw 95 is driven in the anchor 94.

Referring to FIG. 6, for braking, a rider indirectly rocks the rockers 91 in order to move the shoes 92 so that the linings 93 pinch the third portions of the walls 81.

However, plenty of problems have been encountered in the use of the brake 90. As described referring to FIG. 6, the braking is done through the linings 93 pinching the third portions of the walls 81. Friction entails heat. The heat makes the temperature of the third portions of the walls 81 rise to a range between 200 and 300 degrees Celsius. The heat makes the temperature of the linings 93 rise above 600 degrees Celsius. As made from epoxy resin with a sustainable temperature ("Tg") in a range between 130 and 180 degrees Celsius, the third portions of the walls 81 easily become soft at 200 to 300 degrees Celsius. As the groove 83 is defined between the third portions of the walls 81, the third portions of the walls 81 are not supported and can easily be deformed by the linings 93. The rim 80 is deformed and not perfectly circular so that the riding is not smooth. In the worst cases, the rim 80 is twisted.

Such a high temperature generally happens during abrupt braking while riding at high speeds or frequent braking while riding down a hill. In either case, if the walls 81 get soft because of overheating and are deformed from the pinching by the linings 93, the tire 84 will be inadequately clamped by the walls 81, thus entailing leakage of air and endangering the rider.

Furthermore, an anchor 94 must be inserted through a shoe 92 before a lining 93 is put in the shoe 92. This is inconvenient. Moreover, a rider may want to replace the anchor 94 with new one. As the lining 93 blocks the anchor 94, the lining 93 must be removed from the shoe 92 before the anchor 94 can be removed from the shoe 92 and replaced with new one. This is troublesome.

The present invention is therefore intended to obviate or at least alleviate the problems encountered in the prior art.

SUMMARY OF INVENTION

According to the present invention, a brake is provided for a composite rim. The composite rim includes two walls and a bridge. Each of the walls includes a first portion within the bridge, a second portion beside the bridge so that the bridge performs as a heat sink and support for the second portion and a third portion beyond the bridge in order to clamp a tire. The brake includes two rockers, two shoes attached to the rockers and two linings attached to the shoes in order to pinch the second portions of the walls. The position on each of the shoes where each of the linings is located vertically spaced from the position on each the shoes where each of the anchors is located. An anchor attaches the top of each of the shoes to the related rocker and does not attach to the linings.

The primary advantage of the brake according to the present invention is its ability to pinch the composite rim without overheating the rim.

Other advantages and novel features of the invention will become more apparent from the following detailed description in conjunction with the attached drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
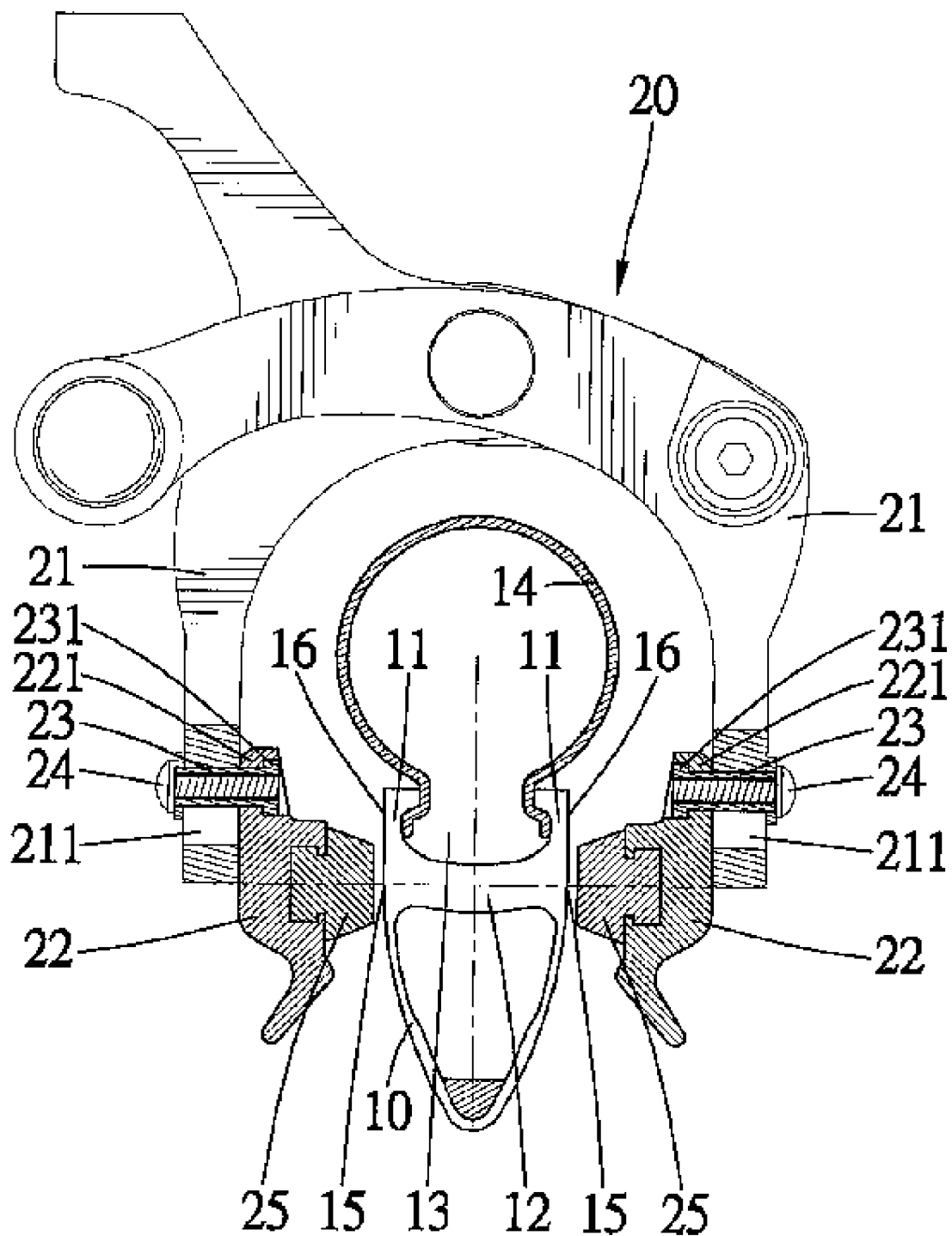
FIG. 1 is a cross-sectional view of a typical brake for a composite rim according to the preferred embodiment of the present invention.
Figure 2:
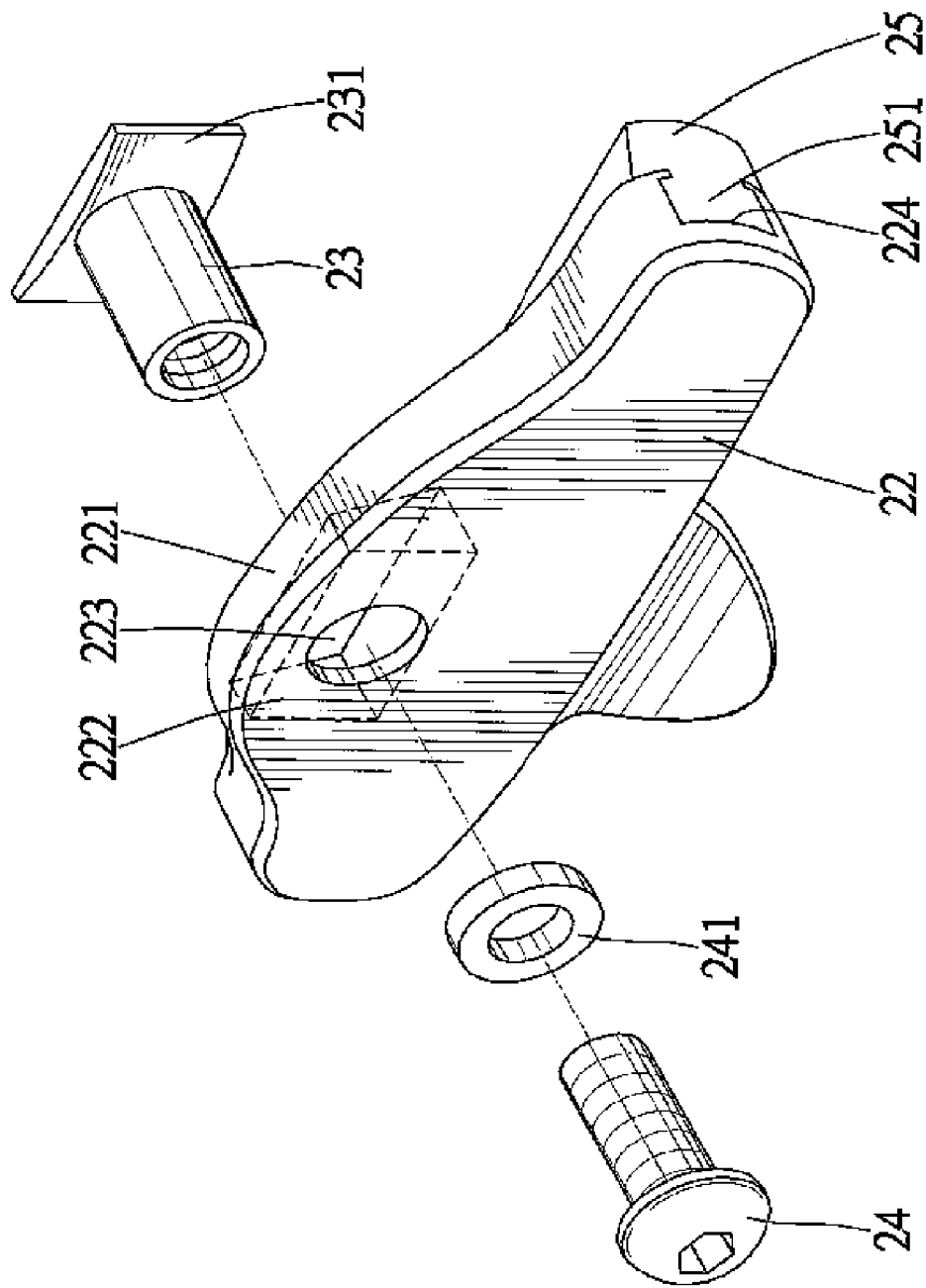
FIG. 2 is a partial exploded view of the brake shown in FIG. 1.
Figure 3:
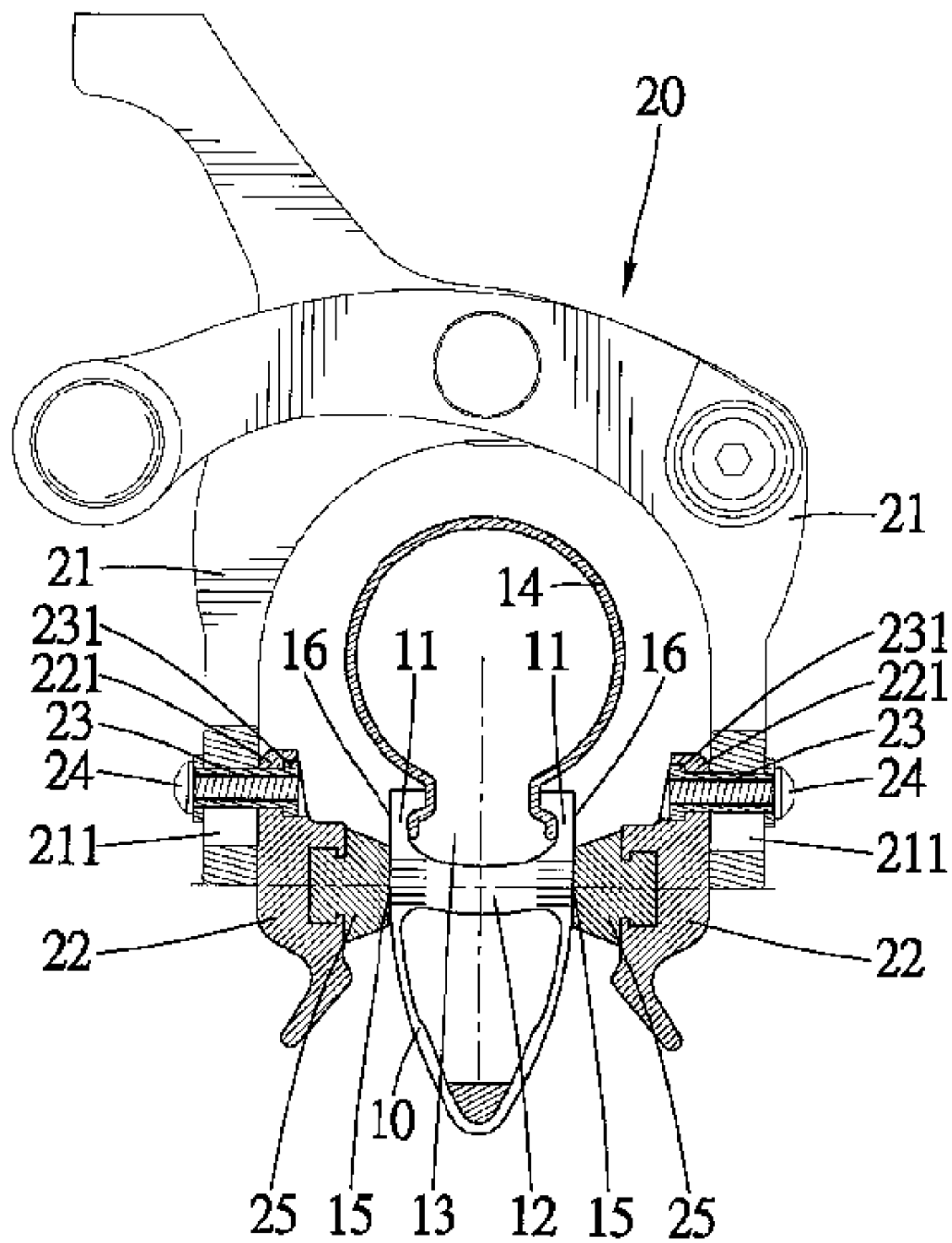
FIG. 3 is similar to FIG. 1 but shows the composite rim pinched by means of the brake.
Figure 4:
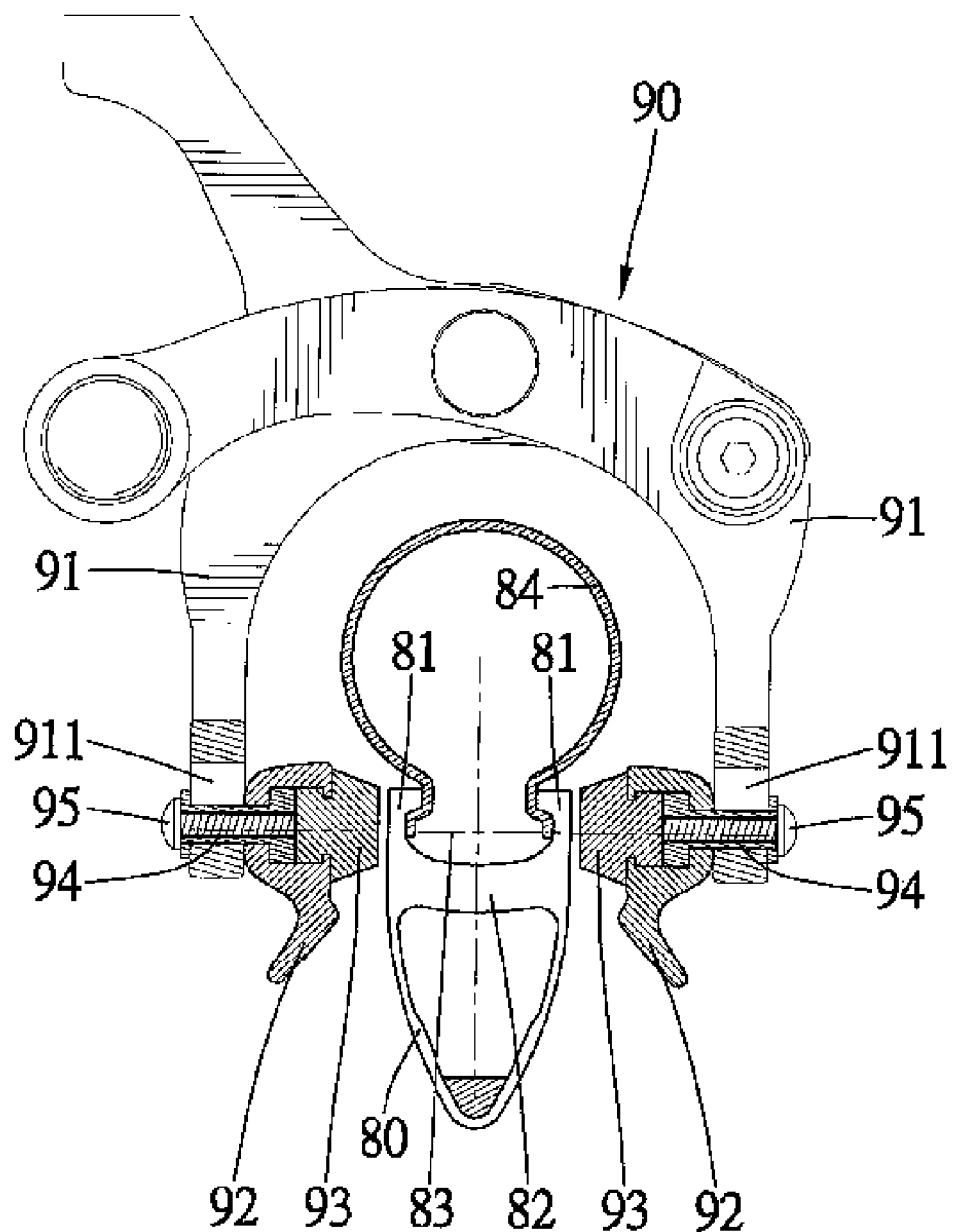
FIG. 4 is a cross-sectional view of a typical brake for a composite rim.
Figure 5:
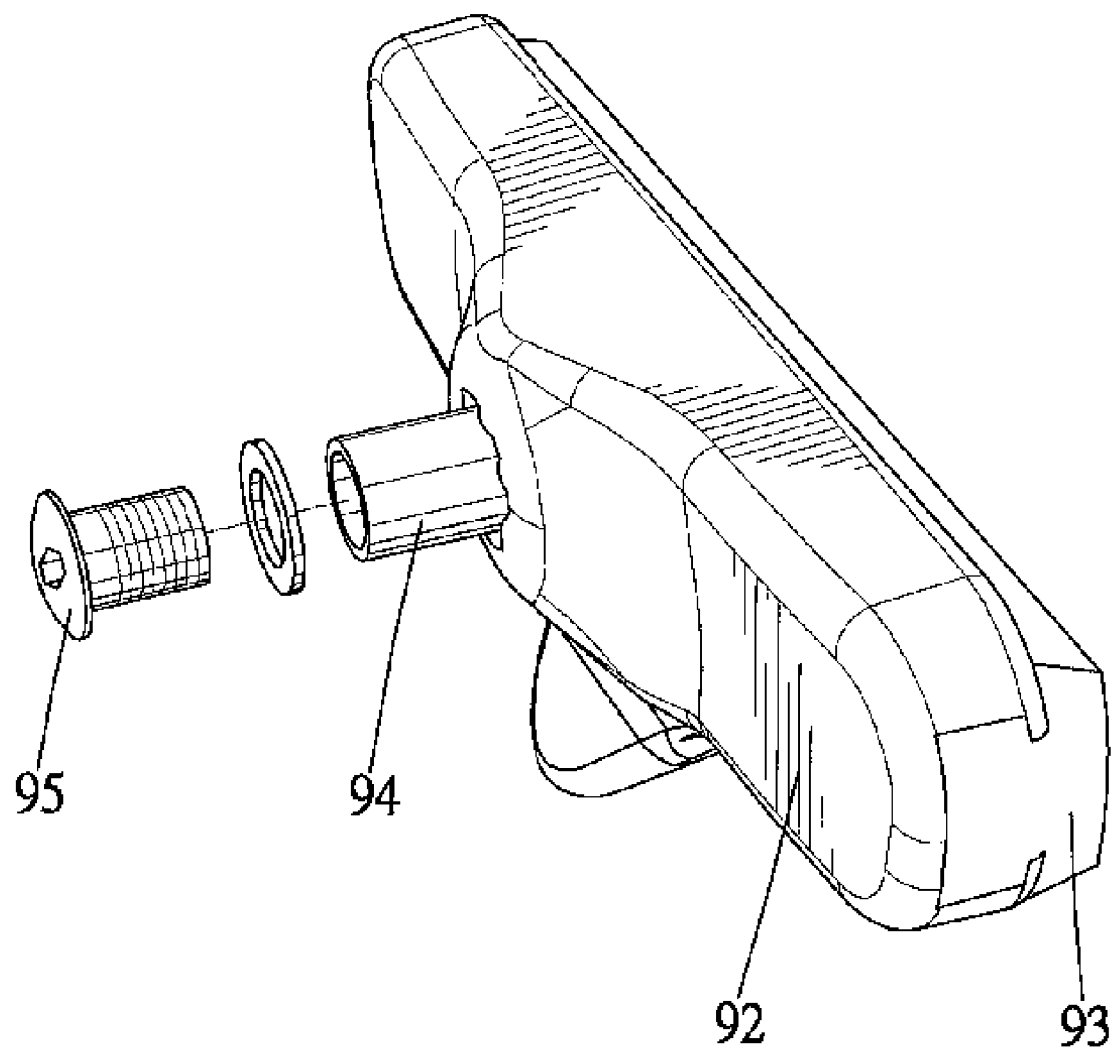
FIG. 5 is a partial exploded view of the brake shown in FIG. 4.
Figure 6:
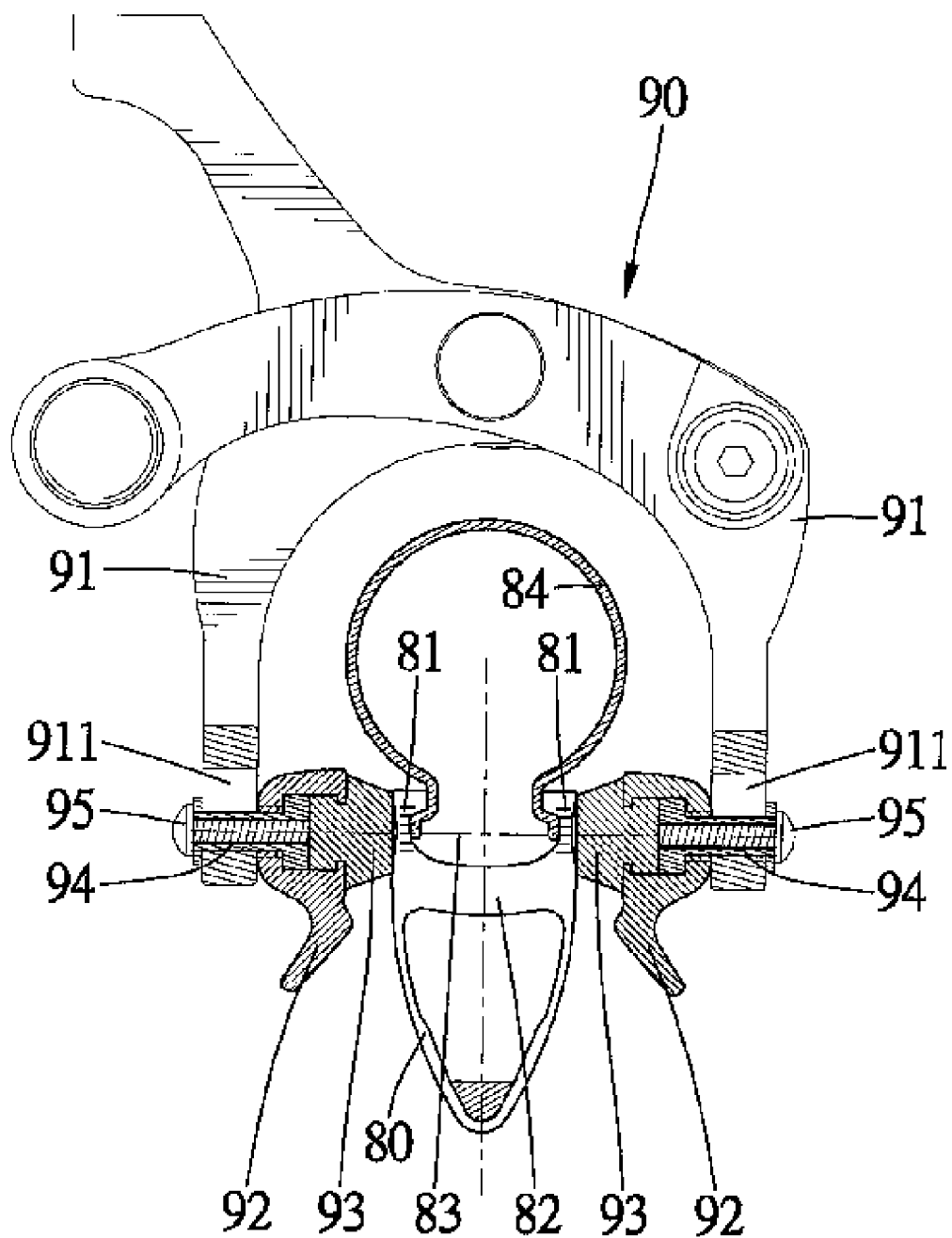
FIG. 6 is similar to FIG. 4 but shows the composite rim pinched by means of the brake.

Referring to FIGS. 1 through 3, there are a composite rim 10 and a brake 20 according to the preferred embodiment of the present invention Like the typical composite rim 80 described in the Related Prior Art, the composite rim 10 includes two walls 11 and a bridge 12 formed between the walls 11. Each of the walls 11 includes a first portion (not numbered) within the bridge 12, a second portion 15 beside the bridge 12 and a third portion 16 beyond the bridge 12. The term "within" means the state of being close to the center of the rim 10. The term "beyond" means the state of being far from the center of the rim 10. A tire 14 is put in a groove 13 defined between the third portions 16 of the walls 11 and clamped by the third portions 16 of the walls 11 when inflated.

The height of the second portions 15 of the walls 11 is equal to the thickness of the bridge 12. The height of the third portions 16 of the walls 11 is equal to the depth of the groove 13.

The bridge 12 is located right between the second portions 15 of the walls 11 and made with adequate thickness and width, i.e., adequate volume. Thermally, the bridge 12 performs as a heat sink for the second portions 15 of the walls 11. Mechanically, the bridge 12 performs as a support for the second portions 15 of the walls 11.

The rim 10 is made from a composite material such as epoxy resin. Epoxy resin exhibits excellent fluidity and good properties of mechanics and involves a low cost; however, it is not thermoduric. In general, the sustainable temperature ("Tg") of epoxy resin is lower than 120 degrees Celsius. With carbon fibers added, the sustainable temperature of epoxy resin will rise to a range between 130 and 180 degrees Celsius, and the strength of epoxy resin at normal temperature will increase.

The brake 20 includes two rockers 21 and two shoes 22 each attached to one of the rockers 21. Each of the rockers 21 defines a slot 211 for allowing the adjustment of the position of the related shoe 22. Each of the shoes 22 includes a front side with a lining 25 and a back side opposite to the front side. The linings 25 are put right beside the second portions 15 of the walls 11.

Referring to FIGS. 1 and 2, each of the shoes 22 includes a lug 221 extended upward from the second side of the shoe 22, a rectangular cavity 222 in the lug 221, an aperture 223 in communication with the rectangular cavity 222 and a dovetail groove 224 in a side. The lug 221 of each of the shoes 22 is put against the slot 211 of one of the rockers 21 while one of the linings 25 is put right beside the second portion 15 of one of the walls 11.

Each of the linings 25 includes a dovetail 251 on a side. The dovetails 251 of the linings 25 are put in the dovetail grooves 224 of the shoes 22. The opposite side of each of the linings 25 can contact the second portion 15 of one of the walls 11. The linings 25 are generally made of rubber, cork or composite materials of rubber and cork.

An anchor 23 and screw 24 are inserted through each of the slot 211 of the rocker 21 to the aperture 223 of the lug 221 of the related shoe 22. The anchor 23 includes an enlarged rectangular head 231. The anchor 231 fit in the cavity 222 of the lug 221 of the shoe 22. The anchor 23 cannot rotate relative to the shoe 22. The screw 24 is driven into the anchor 23 through a washer 241. Thus, the shoe 22 is secured to the rocker 21.

The position on each of the shoes 22 where each of the linings 25 is located is different from the position on each the shoes 22 where each of the anchors 23 is located. The anchors 23 insert through the lugs 221 of the shoes 22. The anchors 23 do not attach directly to the linings 25.

Referring to FIG. 3, for braking, a rider indirectly rocks the rockers 21 in order to move the shoes 22 toward each other so that the linings 25 pinch the second portions 15 of the walls 11. The linings 25 exert normal and frictional forces on the second portions 15 of the walls 11.

Heat is generated because of the friction between the linings 25 and the second portions 15 of the walls 11. Fortunately, the heat will be conducted to the bridge 12 from the second portions 15 of the walls 11 and then dissipated because the bridge 12 is right between the second portions 15 of the walls 11. Overheating of the walls 11 is avoided and so is softening.

Moreover, the second portions 15 of the walls 11 survive the normal forces with the help from the bridge 12 that is right between the second portions 15 of the walls 11. Deformation is prevented.

The brake 20 of the present invention exhibits several advantages. Firstly, the heat generated on the second portions 15 of the walls 11 can quickly be conducted to the bridge 12 since the linings 25 are located right beside the second portions 15 of the walls 11 and the second portions 15 of the walls 11 are Located right beside the bridge 12. Hence, overheating and improperly high temperature will not affect the third portions 16 of the walls 11 that are thin and useful for clamping the tire 14. Accordingly, the possibility of the deformation of the rim 10 is low.

Secondly, the second portions 15 of the walls 11 can survive the normal forces from the linings 25 as the second portions 15 of the walls 11 are supported by the bridge 12 located right between them. Hence, eliminated is the drawback that the thin third portions 16 of the walls 11 deform under the normal forces by the linings 25.

Thirdly, the brake 20 can be used on various bicycles. In fact, the brake 20 can easily be made through modifying a conventional brake. The only thing to do is substitute the shoes 22 for the conventional counterparts. There is no need to dismantle the rockers 21. The modification is convenient and fast. The cost of the modification is low. The security of the brake 20 and the safety of the rider are ensured.

Fourthly, because the lugs 221 are formed on the shoes 22 and the linings 25 are located right beside the second portions 15 of the walls 11 when the lugs 221 are put right besides the slots 211, eliminated is the drawback that the linings 25 contact and deform the third portions 16 of the walls 11.

Fifthly, the insertion of an anchor 24 through a shoe 22 can go before or after the fitting of a lining 25 in the shoe 22. This is convenient.

Sixthly, a rider can remove the anchor 24 from the shoe 22 and replace it with new one without having to remove the lining 93 from the shoe 92 beforehand. This is convenient.

The present invention has been described via detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A brake for pinching a composite rim without overheating the rim, the composite rim comprising two walls and a bridge, each of the walls comprising a first portion within the bridge, a second portion beside the bridge so that the bridge performs as a heat sink and support for the second portion and a third portion beyond the bridge in order to clamp a tire, the brake comprising:

two rockers each defining a slot, with each of the two rockers having a shoe, and with each of the two rockers having a lining mounted on the shoe;

the shoe having a front side, a back side spaced from and opposite the front side, a top side between and connecting the front side and the back side and a bottom side spaced from the top side and between and connecting the front side and the back side, with the shoe facially abutting and attached at the back side to one of the two rockers, wherein the shoe comprises a lug formed thereon, with the lug having a top and with the lug extended upward from the top side and attached to one of the two rockers, wherein each lug defines an aperture;

an anchor driven into the slot of one of the two rockers through the aperture of the lug of the shoe so that the position of the shoe on one of the two rockers can be adjusted; and the lining attached to the front side of the shoe and releaseably contacting the second portion of the walls, with the aperture intermediate the lining and the top, wherein an extent of the lining from the bottom side is less than an extent of the aperture from the bottom side, with the lug and the anchor completely exposed from the lining, with the anchor being removable from the shoe while the lining is attached to the shoe.

2. The brake according to claim 1 wherein the anchor comprises a head restraining the lug.

3. The brake according to claim 2 wherein the lug defines a cavity communicating with the aperture, with the aperture adapted to receive the head of the anchor.

4. The brake according to claim 3 wherein the cavity of the lug is non-circular, wherein the head of the anchor is non-circular and fit in the cavity.

5. The brake according to claim 2 with each of the two rockers comprising a screw driven in the anchor so that one of the two rockers and the lug are clamped between the head of the anchor and a top of the screw.

6. The brake according to claim 1 wherein the shoe defines a dovetail groove, where the lining comprises a dovetail put in the dovetail groove.

7. The brake according to claim 1 wherein the lining is made from a material selected from a group consisting of rubber, cork and composite materials of rubber and cork.

* * * * *